Figure 15:
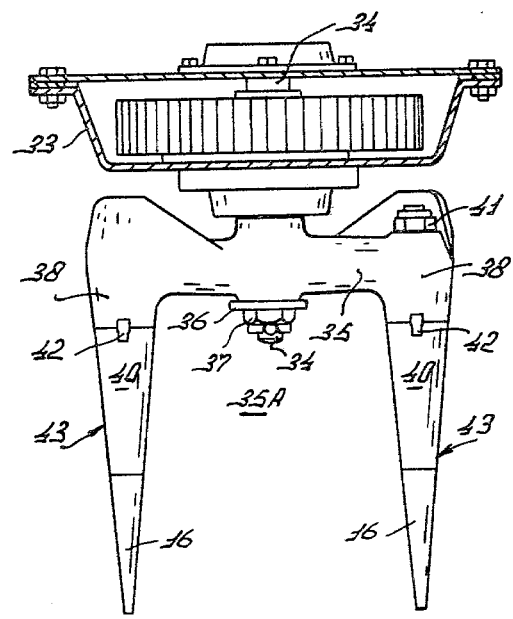

United States Patent [19]

van der Lely

[11] 4,335,789
[45] Jun. 22, 1982

[54] SOIL CULTIVATING IMPLEMENTS

[76] Inventor: Cornelis van der Lely, 7 Brüschenrain, Zug, Switzerland

[21] Appl. No.: 88,150

[22] Filed: Oct. 25, 1979

[30] Foreign Application Priority Data

Oct. 27, 1978 [NL] Netherlands .................. 7810717

[51] Int. Cl.³ ............................................ A01B 33/06
[52] U.S. Cl. ................................. 172/49.5; 172/713
[58] Field of Search .............. 172/59, 49, 111, 713, 172/719, 774, 773, 49.5

[56] References Cited

U.S. PATENT DOCUMENTS

| | | | |
|---|---|---|---|
| 2,088,141 | 7/1937 | Royston | 172/111 |
| 2,110,790 | 3/1938 | Daugherty | 172/59 |
| 2,582,364 | 1/1952 | Tice | 172/59 |
| 2,606,413 | 8/1952 | Gray | 172/713 |
| 2,622,498 | 12/1952 | Wharton | 172/43 X |
| 2,680,944 | 6/1954 | Mathisen | 172/59 |
| 3,028,919 | 4/1962 | Smith | 172/59 |
| 3,326,302 | 6/1967 | Washbond | 172/713 |
| 3,705,630 | 12/1972 | Vissers | 172/713 |
| 3,774,687 | 11/1973 | Lely | 172/59 |
| 3,902,560 | 9/1975 | Lely | 172/59 |
| 3,920,079 | 11/1975 | Lely | 172/59 |
| 3,993,144 | 11/1976 | Lely | 172/59 |
| 4,014,272 | 3/1977 | Lely | 172/59 |
| 4,046,201 | 9/1977 | Lely | 172/49.5 |
| 4,077,476 | 3/1978 | Lely | 172/59 |

Primary Examiner—Richard J. Johnson
Attorney, Agent, or Firm—William B. Mason

[57] ABSTRACT

A cultivating implement has an elongated frame portion that mounts a row of soil working members, each of which rotates about an upwardly extending shaft and mounts a lower tine or tines. The lower shaft end preferably is a flattened horizontal part and can have a threaded stub shaft that extends through a central hole in a matching horizontal tine fastening portion. Alternatively, the tine can be hollow and bolted to one side of a carrier. Preferably, the inner side of the tine is concave and a recess formed. Alternatively, the entire soil working portion is conical and tapers downwardly. The diameter of the upper part is at least five fold that of the lower part and is, at the most, one-fifth the total length of the soil working portion.

9 Claims, 20 Drawing Figures

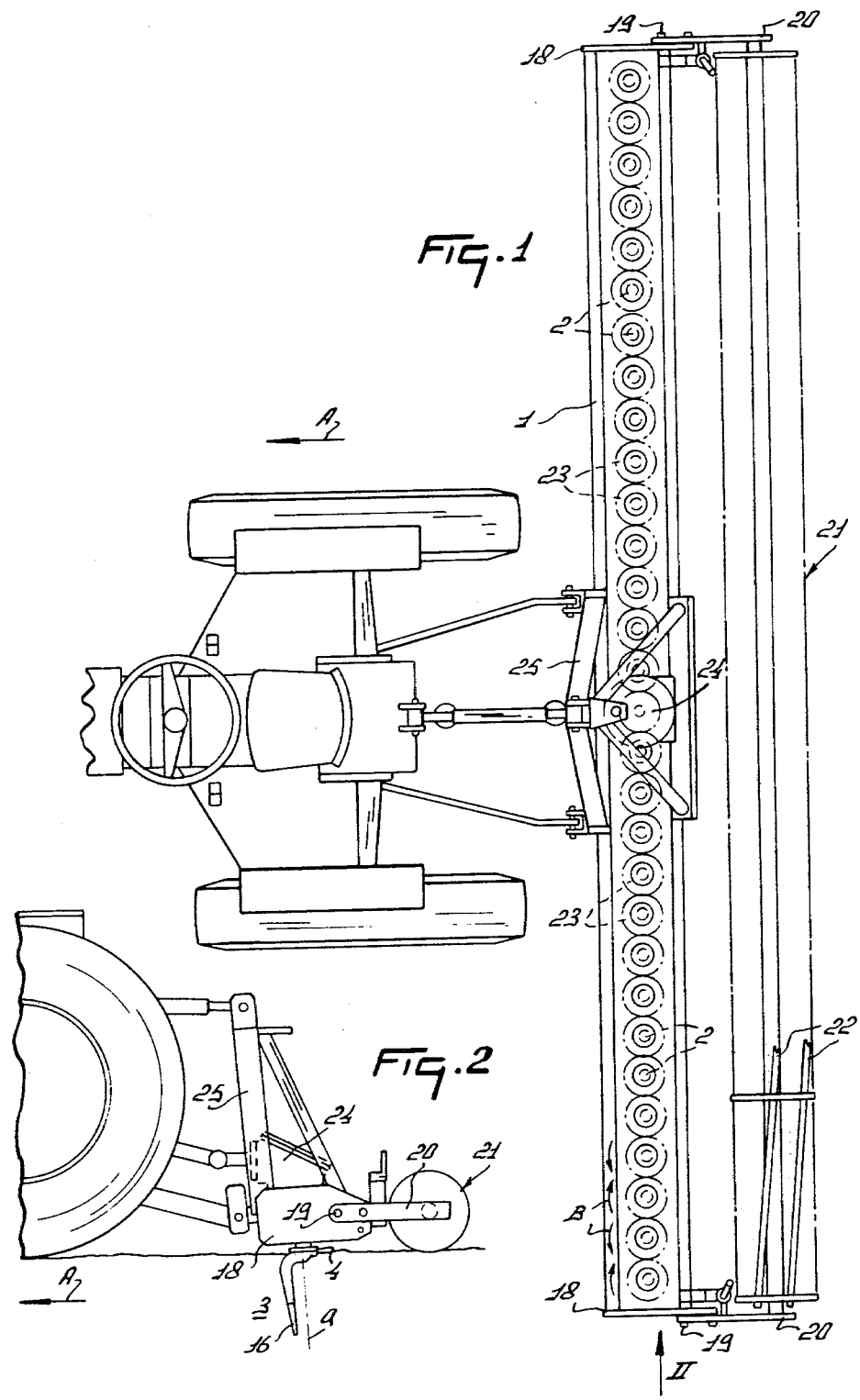

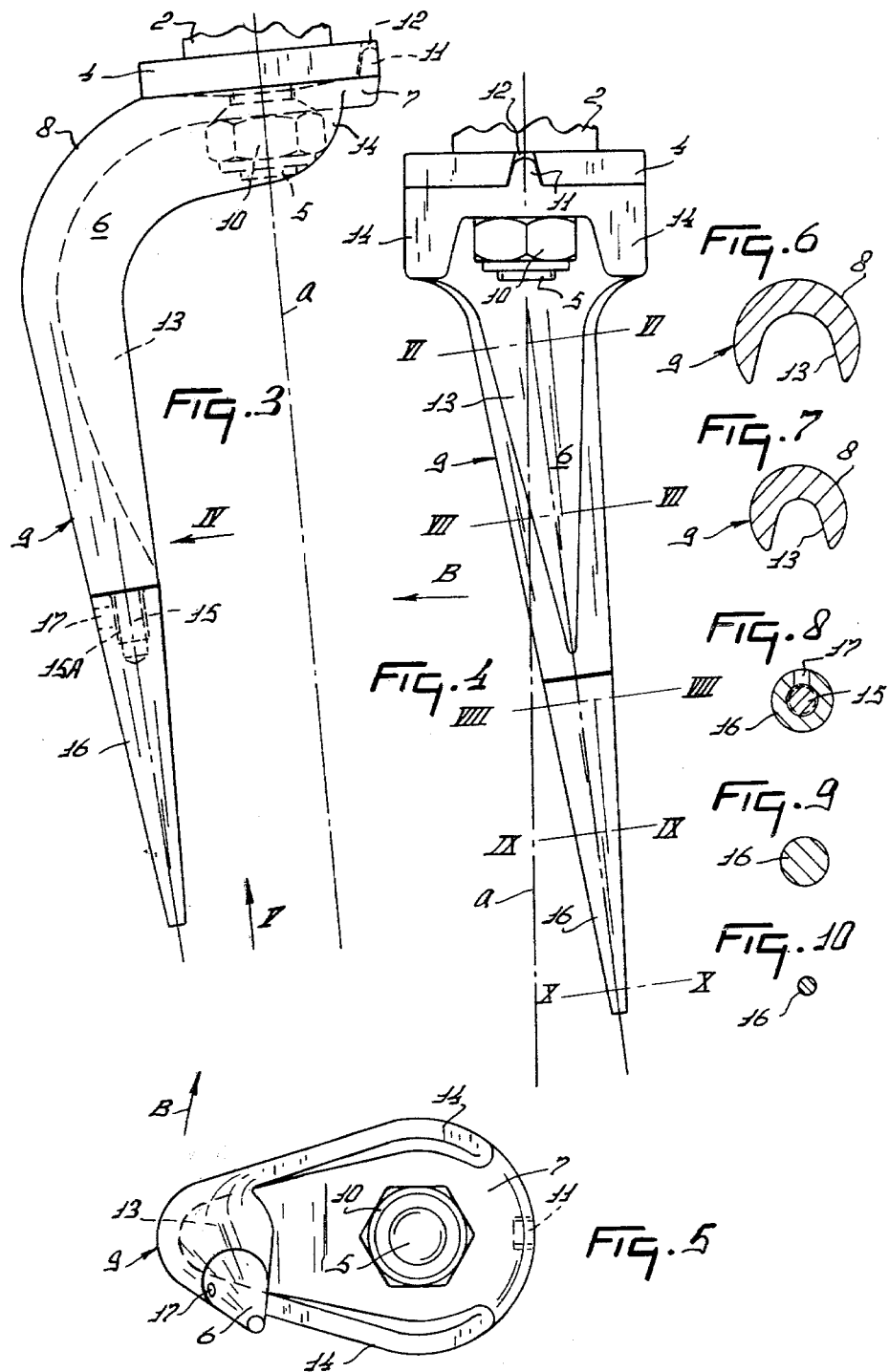

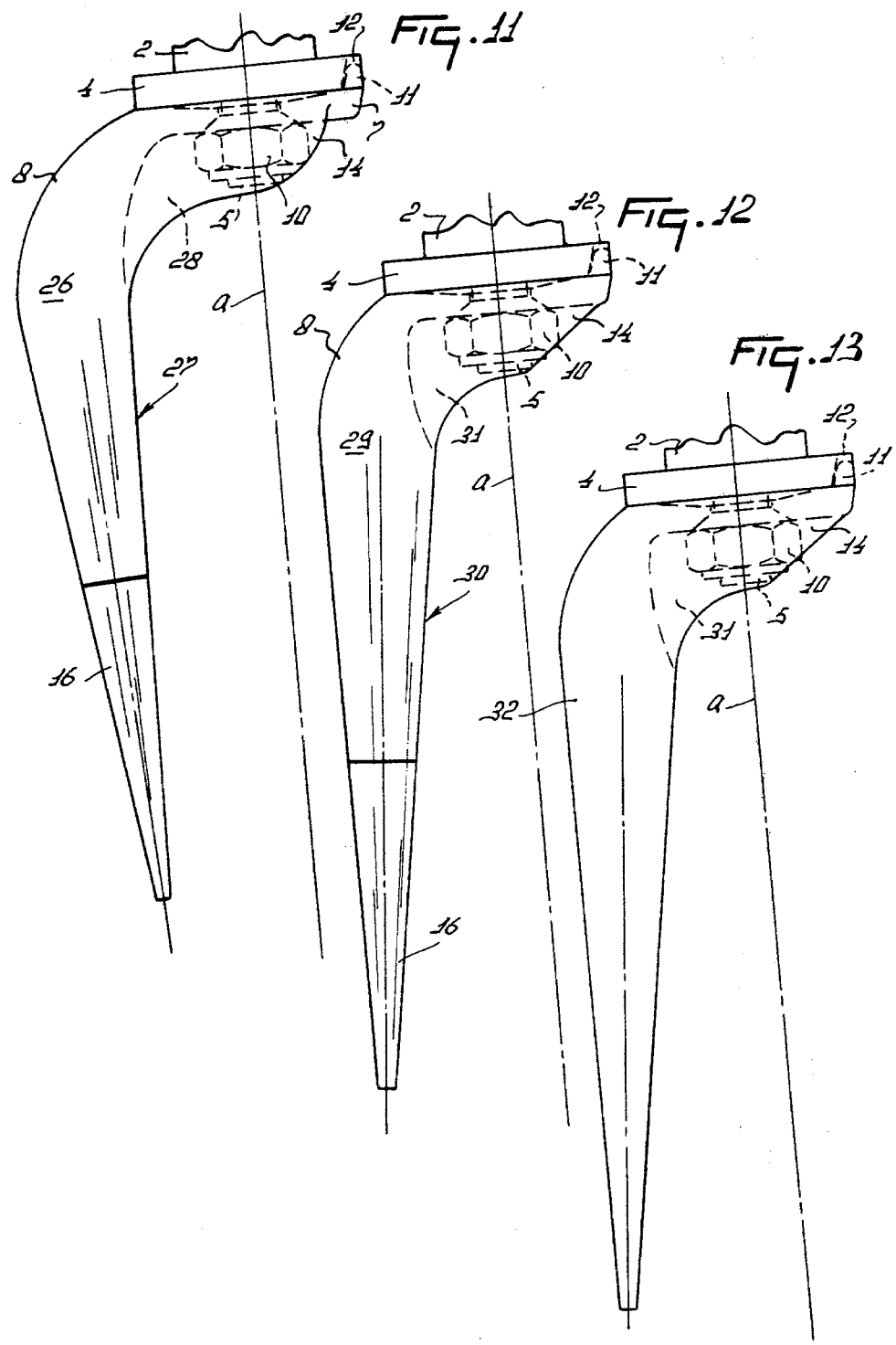

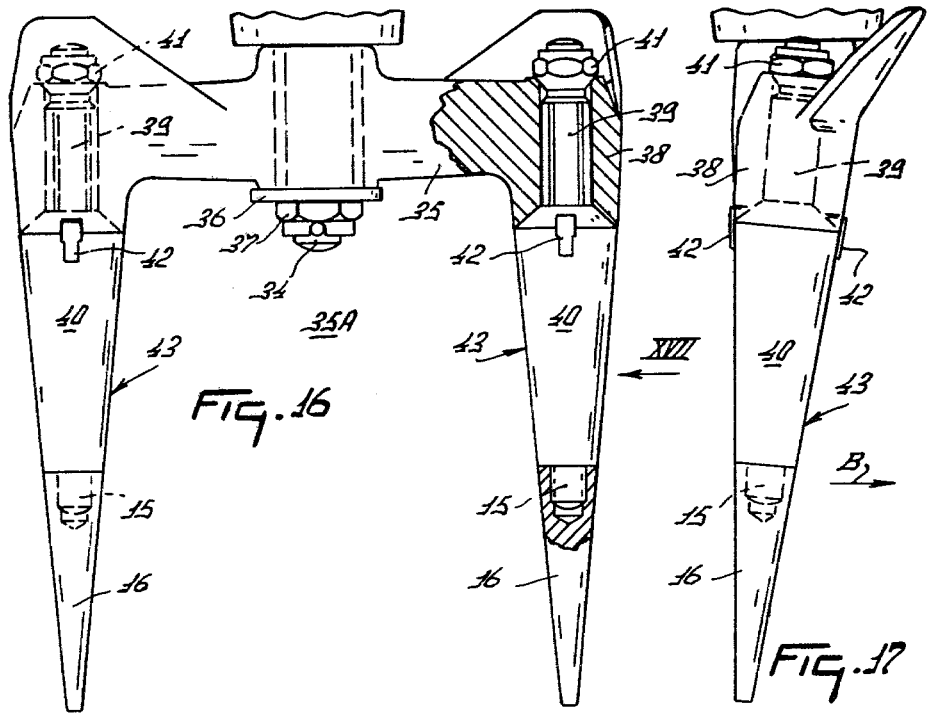
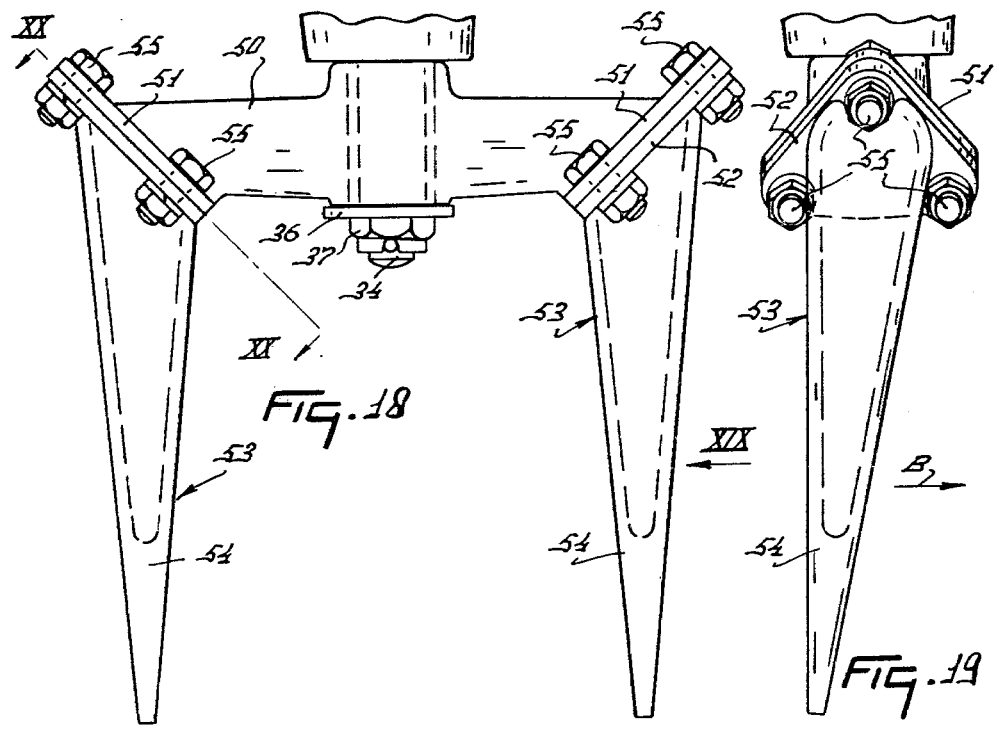

SOIL CULTIVATING IMPLEMENTS

This invention relates to soil cultivating implements or machines of the kind which comprise a frame portion that is movable over the ground and at least one soil working member arranged to be rotatable, by a power source, about a non-horizontal axis. The term "implement(s) or machine(s)" will be shortened to "implement(s)" alone throughout the remainder of this specification for the sake of brevity.

Known soil cultivating implements of this kind tend, when working in fields which are heavily infested with weeds and/or which contain a large number of root remnants, to get such weeds and/or root remnants wound around, or otherwise entangled with, tines of their soil working members to such an extent that the cultivating efficiency is very considerably reduced so that frequent interruptions of work have to be made to effect the tedious job of removing the adhering elongate weeds, root remnants and/or the like from said tines. An object of the present invention is to overcome, or very significantly to reduce, this disadvantage of known implements by providing a tine formation from which adhering elongate material will tend automatically to be shed during continued operation of the implement. Accordingly, one aspect of the invention provides a soil cultivating implement of the kind set forth, wherein the or each soil working member comprises at least one tine having an upright soil working portion of circular or substantially circular cross-section which portion is of downwardly tapering conical or substantially conical configuration, and wherein the diameter of the soil working portion at or adjacent to its upper end is not less than five times the diameter thereof at or adjacent to its lower end, the length of said soil working portion being not less than five times the diameter thereof at or adjacent to its upper end.

For a better understanding of the invention, and to show how the same may be carried into effect, reference will now be made, by way of example, to the accompanying drawings, in which:

FIG. 1 is a somewhat diagrammatic plan view of a soil cultivating implement in accordance with the invention shown connected to the rear of an agricultural tractor.

Figure 14:
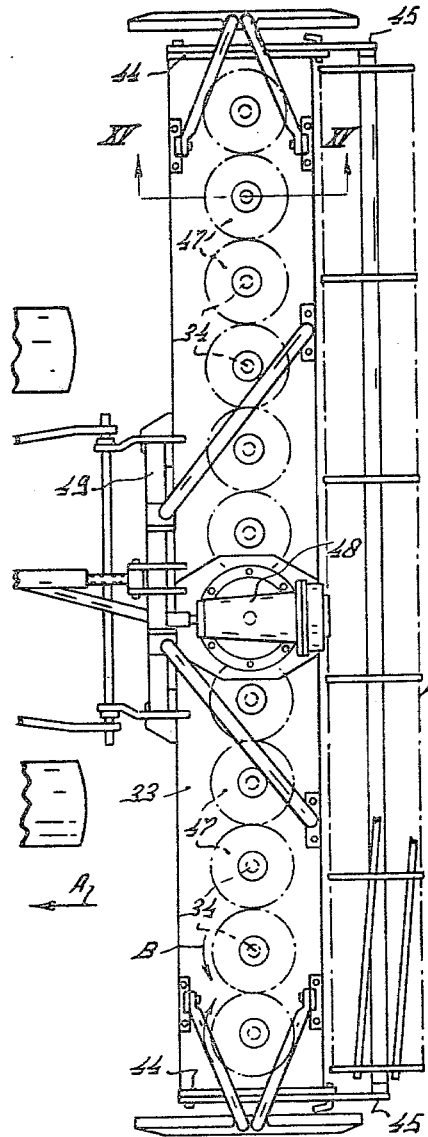
Figure 20:
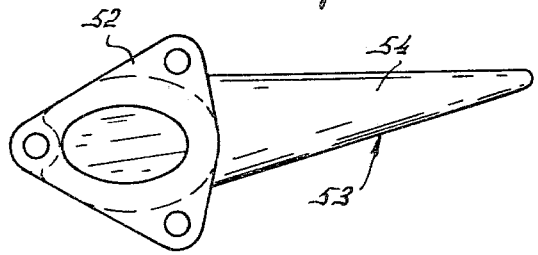

FIG. 2 is a side elevation as seen in the direction indicated by an arrow II in FIG. 1, FIG. 3 is a side elevation, to an enlarged scale, showing the single tine of one soil working member of the implement of FIGS. 1 and 2 in greater detail, FIG. 4 is an elevation as seen in the direction indicated by an arrow IV in FIG. 3, FIG. 5 is an underneath plan view corresponding to FIG. 3 and as seen in the direction indicated by an arrow V in FIG. 3, FIGS. 6, 7, 8, 9 and 10 are sections taken on the lines VI—VI to X—X, respectively, in FIG. 4, FIGS. 11, 12 and 13 are side elevations from the same viewpoint, and to the same scale, as FIG. 3 but illustrate the constructions of second, third and fourth embodiments of soil working tines in an implement in accordance with the invention, FIG. 14 is a somewhat diagrammatic plan view of a second form of soil cultivating implement in accordance with the invention shown connected to the rear of an agricultural tractor, FIG. 15 is a section, to an enlarged scale, taken on the line XV—XV in FIG. 14, FIG. 16 is a part-sectional elevation, to a further enlarged scale, showing the construction of the soil working member of FIG. 15 in greater detail, FIG. 17 is a view as seen in the direction indicated by an arrow XVII in FIG. 16, FIG. 18 is an elevation illustrating an alternative construction of soil working member to that which is illustrated in FIGS. 15 to 17, FIG. 19 is a view as seen in the direction indicated by an arrow XIX in FIG. 18, and FIG. 20 is a section taken on the line XX—XX in FIG. 18.

Referring to FIGS. 1 to 10 of the accompanying drawings, and firstly to FIGS. 1 and 2 thereof, the soil cultivating implement that is illustrated comprises a hollow box-section frame portion 1 which extends substantially horizontally transverse and usually, as illustrated, substantially horizontally perpendicular, to the intended direction of operative travel of the implement which is denoted in serveral Figures of the drawings by an arrow A. A plurality, of which there are thirty in the example that is being described, of shafts 2 are journalled in the hollow frame portion 1 so as to be rotatable about corresponding non-horizontal axes a (FIGS. 2, 3 and 4) which axes a will usually, but not essentially, be substantially vertically disposed when the implement is working on horizontal land. An inspection of FIGS. 2 and 3 of the drawings will show that, in fact, under these circumstances each axis a is contained in a vertical plane that is substantially parallel to the direction A and is inclined upwardly and forwardly at an inclination of only a few degrees to the strict vertical. The longitudinal axes a of the shafts 2, which are also their axes of rotation, are spaced apart from one another at regular intervals which preferably, but not essentially, have magnitudes of substantially 15 centimeters. Each shaft 2 projects downwardly from beneath the bottom of the hollow frame portion 1, the lower end of the downwardly projecting portion being integrally formed with a supporting part 4 embodied in a flat circular disc whose general plane is perpendicular to that of the corresponding axis a. The lower surface of each supporting part 4 integrally carries, at its center, a screwthreaded stub shaft 5 whose longitudinal axis is coincident with the corresponding axis a.

Each supporting part 4 has a corresponding soil working member 3 clamped to its lower surface and, in the embodiment which is being described, each soil working member 3 is afforded by a single soil working tine 6. Each tine 6 comprises a fastening portion 7 which is releasably secured in its appointed working position relative to the respective supporting part 4, at the lower end of one of the shafts 2, by clamping means which will be further described below, it will be seen from FIGS. 3 and 4 of the drawings that the fastening portion 7 of each tine 6 is integrally connected by a curved portion 8 to a straight downwardly directed soil working portion 9 which portion 9 is of downwardly tapering conical or substantially conical configuration. The sizes and shapes of the portions 7, 8 and 9 are such that, with the preferred spacing between the axes a that has been discussed above, the longitudinal axis of each straight downwardly tapering soil working portion 9 is spaced by not less than 5 centimeters, and preferably substantially 6 centimeters, from the longitudinal axis a of the respective shaft 2 at the location at which said longitudinal axis and the axis a are closest to one another. At least as seen in FIG. 3 of the drawings, the longitudinal axis of the soil working portion 9 of the illustrated tine 6 is further from the corresponding axis a at the upper end of that portion 9 than it is at the lower end thereof.

The fastening portion 7 of each tine 6 is centrally recessed to a small extent around a central hole which receives the corresponding stub shaft 5, said fastening portion 7 otherwise being of much the same diameter and thickness as is the overlying supporting part 4. A nut 10 co-operates with each screwthreaded stub shaft 5 and wholly or principally affords the clamping means by which the fastening portion 7 of each tine 6 is secured in its appointed working position relative to the corresponding shaft 2. Each nut 10 clamps the upper surface of the corresponding tine fastening portion 7 firmly against the lower surface of the co-operating supporting part 4 and it will be seen from FIG. 3 of the drawings that the upper clamping surface of each nut 10 is of an upwardly tapering conical configuration which bears centringly against a matchingly shaped surface formed in the mouth of the hole through the fastening portion 7 which receives the stub shaft 5. The upper surface of each fastening portion 7 is formed, at a peripheral location which is opposite to the area at which said fastening portion 7 is integrally connected to the corresponding curved portion 8, with an upwardly directed lug 11 whose opposite flat sides (FIG. 4) are inclined to one another at an angle of substantially 30°. As can be seen in FIGS. 3 and 4 of the drawings, each lug 11 fits in a matchingly shaped notch or recess that is formed at the edge of the respective supporting part 4 and it will be appreciated that, when the nut has been tightened on the stub shaft 5, the co-operation between the lug 11 and notch or recess 12 positively prevents the tine 6 from being turned about the respective axis a relative to the overlying shaft 2 and its supporting part 4.

The soil working portion 9 of each tine 6 is formed with a cavity 13 which cavity 13 commences at a location approximately midway along the length of the radially inner side of said portion 9, the cavity 13 extending upwardly from this point in a progressively widening, and initially progressively deepening, manner, the cavity 13 extending into the curved portion 8 of the tine 6 so as eventually to have its opposite sides merge with two cheeks 14 which cheeks 14 are downward extensions of the fastening portion 7 which lie at opposite sides of the clamping nut 10 when the latter is in position. Reference is directed particularly to FIGS. 3 and 7 inclusive of the drawings to show the formation and disposition of the cavity 13 and of the cheeks 14. FIG. 5 of the drawings shows that the ends of each pair of cheeks 14 which are remote from the soil working portion 9 of the corresponding tine 6 are spaced apart from one another angularly about the respective axis a by substantially 75°. As can be seen in FIG. 3 of the drawings, the depth of the cavity 13 initially progressively increases upwardly to a point beyond which said depth remains substantially constant. The length of the cavity throughout which it is progressively increasing in depth is substantially equal to one-quarter of the overall length of the soil working portion 9 concerned which overall length includes a lower downwardly tapering replaceable element 16 which will be referred to again below.

The cross-sectional views of FIGS. 6 and 7 of the drawings show that the interior of the cavity 13 is of arcuately circular shape and, since the external surface of the soil working portion 9 is substantially circular, or arcuately circular, throughout its length, the cross-section of the soil working portion 9 at the level of FIG. 6 of the drawings is substantially sickle-shaped. Much the same shape is also to be found at the level of FIG. 7 of the drawings. The soil working portion 9 of each tine 6 preferably has a diameter of substantially 5 centimeters at its upper end which diameter should not be less than five times, and preferably substantially eight times, the diameter of said portion 9 at its blunt lowermost end. The axial length of the soil working portion 9 should be not less than five times the diameter thereof at its upper end and should therefore, with the dimension which has been referred to above, not be less than substantially 25 centimeters. As mentioned above, the downwardly tapering replaceable element 16 affords the lower end of each soil working portion 9, the upper region of said portion 9 being formed, at its lower end and at a location beneath the commencement of the corresponding cavity 13, with a central axially extending screwthreaded extension 15 which is of reduced diameter. The upper end of the co-operating element 16 is formed with a matching screwthreaded bore 15A which will co-operate with the extension 15 in mounting the element 16 firmly but releasably on the upper region of the soil working portion 9. Each element 16 has a length which is substantially half that of the soil working portion 9 of which it forms part and is of downwardly tapering conical configuration having a truncated blunt lowermost end. A radial bore 17 is formed in each element 16 at the level of the corresponding screwthreaded bore 15A and is intended to receive the end of a rod or other lever which may be used to assist in installing the elements 16 on, or releasing them from, the screwthreaded extensions 15. In the example which is being described, the soil working portion 9 of each tine 6 has an overall length of substantially 30 centimeters and it will be noted from FIGS. 4 and 5 of the drawings that the longitudinal axis thereof is downwardly and rearwardly inclined by a few degrees so as to trail rearwardly with respect to the intended direction of operative rotation of the soil working member 3 concerned which direction is indicated by arrows B in FIGS. 1, 4 and 5 of the drawings.

The opposite ends of the hollow box-section frame portion 1 of the implement are closed by substantially vertically disposed side plates 18 which are parallel to one another and parallel or substantially parallel to the direction A. The side plates 18 project rearwardly beyond the remainder of the hollow frame portion 1 with respect to the direction A and the leading ends of corresponding arms 20 are turnably connected to said side plates 18 by strong horizontally aligned pivots 19. The arms 20 are turnable upwardly and downwardly about the pivots 19 relative to the side plates 18 and it will be seen from FIGS. 1 and 2 of the drawings that the rearmost regions of said side plates 18 are formed with holes which are equidistant from the axis defined by the aligned pivots 19 and that the arms 20 are formed with single holes which can be brought into register with any chosen holes in said side plates 18 merely by turning the arms 20 upwardly or downwardly about the pivots 19 as may be required. Locking bolts or the like which are only diagrammatically illustrated in FIGS. 1 and 2 of the drawings are provided for entry through the holes in the arms 20 and the selected holes in the rear portions of the side plates 18 to retain the arms 20 in chosen angular settings about the pivots 19. The arms 20 project rearwardly from the side plates 18 with respect to the direction A and their rearmost ends carry substantially horizontally aligned bearings between which an open-work roller 21 is mounted so as to be freely rotatable about a substantially horizontal axis that is perpendicular or substantially perpendicular to the direction A. The roller 21 extends throughout substantially the whole of the combined working width of the thirty (in this embodiment) soil working members 3 and comprises a central axially extending support to which a plurality of circular support plates are secured at regular intervals along the length of the roller which intervals are such that one of said support plates lies at, or very close to, each of the opposite axial ends of the roller 21. The support plates are formed around their peripheries with circular rows of holes and elongate tubular or rod-formation elements 22 are entered lengthwise through said holes in relatively spaced apart relationship with one another so as preferably, as illustrated, to be wound helically around the central support of the roller 21 to some extent.

Each shaft 2 is provided, inside the hollow frame portion 1, with a corresponding straight-toothed or spur-toothed pinion 23, the size and arrangement of the pinions 23 being such that their teeth are successively in mesh with one another so that, during operation, each shaft 2 and the corresponding soil working member 3 will revolve in an opposite direction to the or each immediately neighbouring shaft 2 and soil working member 3. One of the center pair of shafts 2 in the single row of thirty (in this embodiment) such shafts has an upward extension through the top of the hollow frame portion 1 into a gear box 24 inside which bevel pinions (not visible) place said shaft extension in driven connection with a rotary input shaft of the gear box 24, the input shaft having a splined or otherwise keyed end which projects forwardly from the front of the gear box 24 in a direction which is substantially parallel to the direction A. The forwardly projecting end of the rotary input shaft of the gear box 24 is intended to be placed in driven connection with the rear power take-off shaft of an agricultural tractor or other operating vehicle by way of an intermediate telescopic transmission shaft, which is known per se, having universal joints at its opposite ends. This arrangement is illustrated diagrammatically in FIGS. 1 and 2 of the drawings. The front of the hollow frame portion 1, with respect to the direction A, is provided substantially midway across the width of the implement with a coupling member or trestle 25 which is of substantially triangular configuration as seen in either front or rear elevation. Strengthening tie beams diverge downwardly and rearwardly from substantially the apex of the coupling member or trestle 25 to have their spaced lowermost and rearmost ends rigidly secured to a strengthening beam which is mounted at the back of the hollow frame portion 1.

In the use of the soil cultivating implement which has been described, its coupling member or trestle 25 is connected to the three-point lifting device or hitch at the rear of an agricultural tractor or other operating vehicle in a manner which is generally known per se and which is illustrated diagrammatically in FIGS. 1 and 2 of the drawings and the forwardly projecting splined or otherwise keyed end of the rotary input shaft of the gear box 24 is placed in driven connection with the rear power take-off shaft of the same tractor or other operating vehicle by way of the known intermediate telescopic transmission which has universal joints at its opposite ends. The maximum depth to which the tines 6 of the soil working members 3 can penetrate into the ground is adjusted, if required, before work commences by turning the arms 20 upwardly or downwardly about the aligned pivots 19 relative to the side plates 18 of the frame portion 1 and maintaining the newly adjusted positions by appropriate installation of the locking bolts or the like. FIGS. 1 and 2 of the drawings diagrammatically illustrate means for moving the arms 20, together with the roller 21, upwardly or downwardly relative to the side plates 18 but, since this means is known per se and does not form the subject of the present invention, it is not illustrated in detail and will not be described. The roller 21 thus performs a depth control function for the operation of the implement but also serves as a rotatable supporting member and as a soil working member since it will engage and crush any lumps of soil exceptionally left upon the ground surface by the immediately foregoing tines 6. The thirty (in this embodiment) soil working members are revolved in the successively opposite directions B by the rotary power which is derived, in the manner briefly described above, from the tractor or other vehicle which moves the implement over the ground and it is preferred that each such member 3 should rotate at a speed of not less than 400 revolutions per minute. The size and shape of each tine 6 is such that it will work an individual strip of soil having a width of between substantially 20 and substantially 24 centimeters and the distance between the successive axes of rotation a should be substantially 15 centimeters. With this arrangement, the strips of land that are worked by the individual members 3 will overlap one another to produce a single broad strip of cultivated soil having, in the case of the particular implement which is being described, a width of substantially 4.5 meters. The implement operates in a way which makes it economical having regard to the ratio of the work done to the fuel consumed.

It will be recalled from the above description and can be seen in FIGS. 4 and 5 of the drawings that the soil working portion 9 of each tine 6 trails rearwardly from top to bottom with respect to the intended direction of operative rotation B of the soil working member 3 concerned. Each tine 6 has a relatively steep downward taper between the integral transition between its upper end and the corresponding curved portion 8 and its blunt small diameter lowermost end and this feature, combined with the rearwardly trailing arrangement with respect to the direction B, causes any temporarily adhering elongate material, such as weeds, root remnants, lost lengths of baler twine and the like, to be dragged slidably down each tine portion 9 during passage of the tine 6 concerned through the soil until it is lost from the lowermost free end or tip of the tine at a level which will usually be well beneath the ground surface. The replaceable elements 16 of the tine portions 9 are formed from a hard and durable material, which will usually be metallic, but, when any one of them eventually becomes so worn or damaged that it requires replacement, this can easily be effected by entering the end of any convenient rod or other levering tool in the bore 17 concerned and using that rod or other tool to unscrew the element 16 from the respective extension 15. A new element 16 can then be quickly, easily and inexpensively substituted. It may thus be possible very considerably to extend the useful life of one of the tines 6 merely by periodic replacements of the element 16. Naturally, after prolonged use, a time will eventually come when the upper portions of the tine 6 are so worn or damaged that the operating efficiency of the tine falls below an acceptable minimum at which time the whole of the tine will require replacement.

The cavity 13 in the upper half of the soil working portion 9 of each tine 6 enables a considerable quantity of tine material to be saved while still allowing said upper half to have such a thickness that entirely adequate rigidity is retained. In fact, the provision of the cavity 13 improves the attack of the tine upon the soil, the latter being well crumbled as it flows downwardly along the cavity 13 towards the lowermost end of the latter. The fastening portion 7 of each tine 6 is secured in its appointed working position relative to the corresponding shaft 2 and its supporting part 4 by the clamping nut 10 concerned, the center longitudinal axis of that clamping nut 10 being coincident, or substantially coincident, with the axis a of the corresponding shaft 2. The lug 11 co-operates with the notch or recess 12 in preventing the tine 6 from turning about the axis a relative to its shaft 2 and the whole arrangement provides a very strong and reliable fastening of the tine 6 in its appointed working position without complication and consequent undue expense. When replacement of the whole of one of the tines 6 becomes necessary, a box or socket spanner or wrench can readily be employed temporarily to remove the clamping nut 10 concerned even when that nut 10 incorporates an insert designed to prevent accidental loosening. The described and illustrated tines 6 can easily be made by a forging process and it will be noted that the position of each fastening nut 10 immediately below the fastening portion 7 of the tine and between the cheeks 14 prevents that nut and the co-operating screwthread of the extension 15 from being damaged by stones and the like, or worn by abrasive wear, to an extent which will interfere with tine replacement. The tines 6 are so arranged in the single row thereof that, despite the fact that adjacent tines 6 revolve in opposite directions, there will always be a considerable degree of clearance between them and this makes it very unlikely indeed that any stones or other large hard objects will become jammed between neighbouring tines during operation, particularly if that operation is upon previously cultivated soil.

FIGS. 11, 12 and 13 of the drawings illustrate three alternative tine constructions and the way in which those tines are secured in their appointed working positions. However, many of the parts which are illustrated in FIGS. 11, 12 and 13 of the drawings are identical, or very similar, to parts which have already been described above and, accordingly, such parts are illustrated by the same references as have been employed in FIGS. 1 to 10 of the drawings and will not be described in detail again. FIG. 11 illustrates a tine 26 which comprises a soil working portion 27 that is of the same downwardly tapering shape as described above for the tines 6. The tine 26 is also secured in its appointed position in the same way as has been described above. However, in this case, each fastening nut 10 is disposed in a cavity 28 that is formed principally in the radially inner (with respect to the corresponding axis of rotation a) side of the curved portion 8 of the tine, the cavity 28 merging into the space beneath the fastening portion 7 of the tine 26 which is flanked by the two cheeks 14.

The soil working portion 27 of each tine 26 is of circular or substantially circular cross-section throughout its length, exhibiting no cavity, but once again has substantially its lower half in the form of one of the downwardly tapering replaceable elements 16. When the tine 26 is installed in its working position, the fastening nut 10 again lies centrally with respect to the axis a in a protected position between the two cheeks 14. Although not apparent in FIG. 11 of the drawings, it is noted that the soil working portion 27 of each tine 26 again trails from top to bottom with respect to the intended direction of operative rotation B of the soil working member 3 concerned in the same manner as has been described above for the tines 6 with particular reference to FIGS. 4 and 5 of the drawings. It has been found that the tines 26 are particularly suitable for the cultivation of very heavy soil.

FIG. 12 of the drawings illustrates a tine 29 which is very similar in many respects to the tine 26 of FIG. 11. However, the curved portion 8 between the fastening portion 7 thereof and the soil working portion 30 thereof is shorter than in the embodiment of FIG. 11 and encompasses an angle of a little less than 90° so that the longitudinal axis of the soil working portion 30 is downwardly divergent, rather than convergent, with respect to the axis of rotation a as seen in the elevational view of FIG. 12. A cavity 31 is formed in the radially inner (with respect to the axis a) side of the curved portion 8 and that cavity again merges with the nut-receiving space which is formed between the two cheeks 14 immediately beneath the fastening portion 7. FIG. 13 illustrates a tine 32 which is similar to the tine 29 of FIG. 12 in substantially all respects except that its soil working portion is of integral formation throughout its length and does not incorporate one of the replaceable elements 16 so that the whole tine 32 must be replaced if it becomes badly worn or damaged. The tines 29 and 32 of FIGS. 12 and 13 of the drawings are fastened in their appointed positions, and operate, in substantially the same way as the tines 6 and 26 of FIGS. 1 to 11 of the drawings but the fact that the lowermost free ends or tips of their soil working portions are further spaced from the corresponding axes a than in the previous embodiments enables said tines 29 and 32 to work strips of soil of greater width at a level beneath that of the ground surface and can thus produce a superior cultivating effect with some soils and under certain working conditions.

FIGS. 14 to 17 of the drawings illustrate an alternative form of soil cultivating implement in accordance with the invention which implement comprises a hollow box-section frame portion 33 that extends substantially horizontally transverse and usually, as illustrated, substantially horizontally perpendicular, to the intended direction of operative travel A. A plurality (in this case, twelve) of non-horizontal shafts 34 are rotatably journalled in bearings carried by the upper and lower walls of the frame portion 33 in such a way that said shafts 34 extend in a single row with their vertically or substantially vertically disposed longitudinal axes/axes of rotation spaced apart from one another at regular intervals which conveniently, but not essentially, have magnitudes of substantially 25 centimeters. The lowermost end of each shaft 34 projects downwardly from beneath the bottom of the hollow frame portion 33, the downwardly projecting portion being externally splined to receive the matchingly internally splined hub at the center of a substantially horizontally extending support or carrier 35 of a corresponding rotary soil working member which is generally indicated by the reference 35A (FIGS. 15 and 16). Axial disengagement of the hub of each support or carrier 35 from the lowermost end of the corresponding shaft 34 is prevented by forming a lowermost end part of that shaft 34 as a reduced diameter stub shaft having an external screwthread. A fastening nut 37 is mounted on the screwthreaded stub shaft and co-operates with the lowermost end of the corresponding hub by way of a washer 36. As illustrated somewhat diagrammatically in FIGS. 15 and 16 of the drawings, accidental loosening of each nut 37 during the operation of the implement is positively prevented by providing the screwthreaded lowermost end of each shaft 34 with a transverse split pin or the like.

The opposite ends of each substantially horizontally disposed support or carrier 35 are integrally provided with substantially vertically disposed sleeve-like tine holders 38 each of which holders 38 receives the cylindrical fastening portion 39 (FIGS. 16 and 17) of a corresponding soil working tine 40. An uppermost end part of each fastening portion 39 is of reduced diameter and is formed with an external screwthread which screwthread co-operates with a corresponding fastening nut 41. In addition, the lowermost end of each sleeve-like holder 38 is formed with diametrically opposed notches or recesses into which fit diametrically opposed lugs 42 that are furnished on each tine 40 at substantially the integral junction between the lowermost end of the fastening portion 39 and the uppermost end of a soil working portion 43 thereof. As can be seen best at the right-hand side of FIG. 16 of the drawings, each tine 40 is firmly but releasably maintained in its appointed working position by tightening the corresponding fastening nut 41 onto the screwthreaded upper end part of the fastening portion 39, the lugs 42 co-operating with the notches or recesses in the lower end of the associated tine holder 38 so as positively to prevent the tine 40 concerned from turning about the longitudinal axis of its fastening portion 39 in the holder 38. The soil working portion 43 of each tine 40 has substantially the same downwardly tapering conical configuration as do the soil working portions of the tines in the preceding embodiments. Thus, each soil working portion 43 is of circular or substantially circular cross-section and has a diameter at, or adjacent to, its uppermost end which is not less than five times the diameter of the same portion at, or adjacent to, its blunt lowermost end, a diametral measurement at the upper end of eight times the diametral measurement at the lower end being preferred. In addition, the axial length of each soil working portion 43 is not less than five times the diameter of that portion at, or adjacent to, its uppermost end. As in some of the preceding embodiments, approximately the lowermost half of each soil working portion 43 is in the form of a downwardly tapering replaceable element 16 which is connected to the upper half of the same portion 43 by an externally screwthreaded extension 15 and a co-operating internally screwthreaded bore as already described above. FIG. 17 of the drawings shows that each tine 40 trails rearwardly from top to bottom by a few degrees with respect to the intended direction of operative rotation B of the corresponding soil working member 35A and it is also noted that each fastening nut 41, and the co-operating screwthread, is protected against direct impacts with stones and the like, and against excessive abrasive wear, by a shield which extends obliquely upwardly and forwardly (with respect to the direction B) immediately in front thereof, said shield being formed integrally with the corresponding holder 38 and support or carrier 35.

The opposite ends of the hollow box-section frame portion 33 are closed by vertically or substantially vertically disposed side plates 44 which side plates 44 are parallel or substantially parallel to one another and to the direction A. Both side plates project a short distance rearwardly behind the remainder of the frame portion 33 with respect to the same direction. Strong substantially horizontally aligned pivots are mounted at the tops and fronts of the two side plates 44 relative to the direction A and arms 45 are turnable upwardly and downwardy about the corresponding pivots alongside the respective plates 44. The arms 44 extend generally rearwardly from the two pivots to locations which are behind the frame portion 33 and their rearmost ends carry substantially horizontally aligned bearings between which an open-work ground roller 46 is mounted in a freely rotatable manner. The roller 46 may be basically identical in construction to the previously described roller 21 except that, in the embodiment of FIGS. 14 to 17 of the drawings, the roller 46 will have an axial length/working width of substantially 3 meters rather than substantially 4½ meters in the case of the roller 21 which can be seen in FIGS. 1 and 2 of the drawings. The rearwardly projecting portions of the side plates 44 are formed with curved rows of holes that are equidistant from the axis which is defined by the aligned pivots about which the arms 45 are turnable and each arm 45 is also formed with at least one hole at the same distance from said axis. The roller 46 can be turned upwardly or downwardly about the aligned pivots with respect to the frame portion 33 to bring it to any desired level relative to that frame portion. Locking pins or equivalent locking bolts which are shown diagrammatically in FIG. 14 are entered through the holes in the arms 45 and chosen holes in the rearwardly projecting portions of the side plates 44 to maintain any chosen level of the roller 46 with respect to the frame portion 33 as long as may be desired and it will be realised that the chosen level is a principal factor in determining the depth of penetration of the tines 40 into the soil which is possible when the implement is in operation.

Each shaft 34 is provided, inside the frame portion 33, with a corresponding straight-toothed or spur-toothed pinion 47, the size of said pinions 47 being such that each of them has its teeth in mesh with those of the or each of its immediate neighbours. Thus, when the implement is in operation, each pinion 47, together with the corresponding shaft 34 and soil working member 35A, will revolve in a direction which is opposite to the direction of rotation of the or each immediately neighbouring similar assembly. The directions of rotation B of two such assemblies are indicated in FIG. 14 of the drawings as well as in FIG. 17 in respect of one of the soil working members 35A. One of the center pair in the row of twelve (in this embodiment) shafts 34 has an upward extension through the top of the hollow frame portion 33 into a gear box 48 which is secured in position above the top of said frame portion 33. Shafts and bevel pinions (not visible) inside the gear box 48 place the shaft extension which has just been mentioned in driven connection with a substantially horizontal rotary input shaft of the gear box 48 which latter shaft has a leading splined or otherwise keyed end that projects forwardly from the gear box 48 in substantially the direction A. It is noted that the rear of the gear box 48 carries a change-speed gear which is known per se and by which the transmission ratio between the rotary input shaft of the gear box 48 and the upwardly extending shaft 34 can be varied to alter the speed of rotation of the soil working members 35A without having to change the initiating speed of rotation that is applied to said input shaft from the rear power take-off shaft of an agricultural tractor or other operating vehicle through the intermediary of a telescopic transmission shaft, which is known per se, having universal joints at its opposite ends. The front of the hollow frame portion 33, with respect to the direction A, is provided, substantially midway between the planes of the two side plates 44, with a coupling member or trestle 49 that is of generally triangular configuration as seen in either front or rear elevation. The coupling member or trestle 49 is constructed and arranged for connection to the rear three-point lifting device or hitch of an agricultural tractor or other operating vehicle and it will be noted that strengthening tie beams diverge downwardly and rearwardly, with respect to the direction A, from locations near to the apex of the coupling member or trestle 49 to horizontally spaced apart locations at the top and back of the frame portion 33.

In the use of the soil cultivating implement which has been described with reference to FIGS. 14 to 17 of the drawings, its coupling member or trestle 49 is connected to the rear three-point lifting device or hitch of an agricultural tractor or other operating vehicle in the generally known manner which is illustrated somewhat diagrammatically in FIG. 14 of the drawings and the forwardly projecting rotary input shaft of the gear box 48 is placed in driven connection with the rear power take-off shaft of the same tractor or other vehicle by way of the known telescopic transmission shaft which has universal joints at its opposite ends. Adjustments which may be made, if necessary, before work commences include raising or lowering the level of the roller 46 relative to that of the frame portion 33 in the manner described above to control the maximum depth to which the tines 40 can penetrate into the soil and increasing or decreasing the speed of rotation of the soil working members 35A by an appropriate manipulation of the change-speed gear at the rear of the gear box 48. These adjustments will usually be made having regard to the nature and condition of the soil that is to be dealt with and the particular purpose for which that soil is required after cultivation. As the implement is moved operatively in the direction A, the soil working members 35A will all be rotated in the successively opposite directions B and, since the spacing between the two tines 40 of each member 35A is a little greater than the spacing between the axes of rotation (preferably substantially 25 centimeters) of the shafts 34, the strips of soil which are worked by the individual members 35A will overlap one another to produce a single broad strip of worked land having, in this embodiment, a width of substantially 3 meters. The two soil working members 35A which are at the opposite ends of the row of twelve of them co-operate in working the soil with pivotally mounted shield plates whose lower edges slide over the ground surface in the direction A. The shield plates are illustrated in FIG. 14 of the drawings but will not be described in detail since their construction and function, which is known per se, is not relevant to the present invention. The downwardly tapering conical soil working portions 43 of the tines 40 are again readily capable of shedding any weeds, root remnants or other elongate material that may temporarily become entangled with them because of their relatively steeply downwardly tapering configuration and their rearwardly trailing disposition relative to the directions B. Any adhering elongate material is dragged downwardly by the soil towards the blunt tips of the soil working portions 43 where it is shed from the tines usually at a significant depth below ground level. As already described above, the elements 16 of the tines 40 can often be replaced alone to bring the tines back to full operating efficiency before prolonged usage inevitably necessitates complete tine replacement. The tines are relatively inexpensive to produce but are very effective in operation while being highly resistant to fouling by weeds, root remnants and the like for any significant length of time when they are in use.

FIGS. 18 to 20 of the drawings illustrate an alternative form of soil working member which has a substantially horizontally disposed support or carrier 50 which is provided with a central hub that is firmly but releasably secured to the downwardly projecting externally splined portion of one of the shafts 34 in the same manner as has already been described with particular reference to FIGS. 15 and 16 of the drawings. The opposite ends of each support or carrier 50 carry substantially triangular plates 51 whose planes are inclined to the longitudinal axis of the support or carrier 50 concerned at opposite angles of substantially 45° in such positions that the lower edges of said plates 51 are closer to the corresponding shaft 34 than are the uppermost corners of the plates. Each plate 51 has a matchingly shaped tine fastening portion 52 firmly but releasably secured to it by three bolts 55 that extend through aligned holes formed close to the three corners of the abutting substantially triangular plate 51 and substantially triangular tine fastening portion 52. As can be seen in the drawings, each bolt 55 carries a corresponding nut and a known split resilient washer which tends to resist loosening of the nut. Each tine fastening portion 52 is mounted at the upper end of a corresponding soil working portion 54 of a tine 53 and it will be seen from FIG. 19 of the drawings that each soil working portion 54 is, as in the preceding embodiments, disposed so as to trail rearwardly from top to bottom by a few degrees with respect to the intended direction of operative rotation B of the corresponding soil working member. Each soil working portion is of circular or substantially circular cross-section, tapers downwardly in a conical manner from top to bottom and is so dimensioned that the magnitude of its diameter at a location at, or adjacent to, its uppermost end is not less than five times the diameter thereof at, or adjacent to, its lowermost end. It is, in fact, preferred that the "upper" diameter should be substantially eight times the "lower" diameter and it is noted that the axial length of each portion 54 is not less than five times the diameter thereof at, or adjacent to, its uppermost end. The illustrated soil working portions 54 actually have lengths of substantially 30 centimeters.

It can be seen in FIGS. 18 to 20 of the drawings that the soil working portion 54 of each tine 53 is hollow, the cavity therein extending downwardly from the fastening portion 52 (see FIG. 20) throughout at least the upper two-thirds of the axial length of the portion 54. A substantially constant wall thickness is maintained by tapering the cavity downwardly at the same angle as the outer surface of the corresponding portion 54. The tines 53 can be light in weight, and relatively inexpensive, as a result of the provision of the cavities in their soil working portions 54 and the shape and trailing disposition of each soil working portion 54 is again such as to promote rapid shedding of any weeds, root remnants or other elongate material that may temporarily become entangled with any tine 53. The way in which the tines 53 are releasably connected to the supports or carriers 50 is simple but highly effective and allows any tine that becomes badly worn or damaged after prolonged usage to be easily and quickly replaced at low cost. It is noted that single ones of the tines 40 or 53 could be used in the implement of FIGS. 1 and 2 of the drawings in place of the single tines 6, 26, 29 or 32.

The soil cultivating implement embodiments that have been described with reference to FIGS. 1 to 13 of the accompanying drawings also form the subject of our co-pending patent application Ser. No. 088,160, filed Oct. 25, 1979, to which reference is directed.

Although various features of the soil cultivating implements that have been described and/or that are illustrated in the accompanying drawings will be set forth in the following claims as inventive features, it is emphasized that the invention is not necessarily limited to those features and that it includes within its scope each of the parts of each soil cultivating implement that has been described, and/or that is illustrated in the accompanying drawings, both individually and in various combinations.

I claim:

1. A soil cultivating implement comprising frame means and at least one soil working member, supported on said frame means, said member being rotatable about an upwardly extending axis and comprising at least one tine, said tine having a substantially horizontal upper fastening portion connected to an elongated lower soil working portion by an intermediate curved portion, said soil working portion being generally conical in configuration and tapering downwardly to a lower end, a cavity formed at the radially innerside of said curved portion with respect to the axis of rotation of the soil working member, the outer surface of said curved portion being generally convex, said cavity extending throughout at least a major part of the upper half of said soil working portion and extending into said fastening portion, fastening means for clamping said tine to the remainder of the soil working member being located within said cavity.

2. An implement as claimed in claim 1, wherein said fastening portion is releasably secured to a supporting part at the lower end of a shaft of said soil working member, said shaft defining the axis of rotation of said member and centrally located clamping means securing the fastening portion to said part, said clamping means being a nut on a screwthreaded stubshaft of the supporting part, said fastening portion having a central hole that receives the stubshaft and an upwardly tapering lug being received in a matching notch in said supporting shaft.

3. An implement as claimed in claim 1, wherein said cavity increases in width and depth in an upward direction from the lowermost portion thereof.

4. An implement as claimed in claim 1, wherein a cross-section of said soil working portion in the region of said cavity is substantially sickle-shaped.

5. An implement as claimed in claim 1, wherein the diameter of the upper end of said soil working portion is not less than about five times the diameter of said lower end.

6. An implement as claimed in claim 1, wherein a lower part of said soil working portion comprises a downwardly tapering replaceable element and said element has about the same angle of taper as the upper part of said soil working portion.

7. A tine as claimed in claim 1, wherein said cavity extends throughout the length of the curved portion into said fastening and soil working portions, said cavity being relatively narrow in the soil working portion and relatively wide in said fastening portion.

8. A soil cultivating tine adapted for connection to support means that is rotatable about an upwardly extending axis, said tine having a substantially horizontal, upper fastening portion connected to an elongated lower soil working portion by an intermediate curved portion, said soil working portion being generally conical in configuration and tapering downwardly to a lower end, a cavity located at the radially inner side of the curved portion with respect to the axis of rotation of the support means and extending into said fastening portion, the radially outer surface of said curved portion being convex and curved opposite said cavity, said fastening portion comprising means for clamping the tine to said support means and the sides of said cavity at least partly surrounding the connecting means, said cavity extending throughout the length of the curved portion into said fastening and soil working portions, said cavity being relatively narrow in the soil working portion and relatively wide in said fastening portion.

9. A tine as claimed in claim 8, wherein said fastening portion is flat centrally and is edged with side cheeks.

* * * * *